Patented June 1, 1937

2,082,025

UNITED STATES PATENT OFFICE 2,082,025

METHOD FOR THE REDUCTION OF FURFURAL AND FURAN DERIVATIVES

Fredus N. Peters, Jr., Evanston, Ill., assignor to The Quaker Oats Company, Chicago, Ill., a corporation of New Jersey No Drawing. Application April 13, 1933, Serial No. 665,963

7 Claims. (Cl. 260—54)

My invention relates to an improved method for the reduction of furfural and furan derivatives for the production of commercially useful products.

This application is a continuation in part of an application Serial No. 171,725, filed by me on February 28, 1927, and originally entitled "Method for the reduction of furfural and furan derivatives." Patent No. 1,903,850, entitled "Method for the reduction of furfural acetone and furan derivatives," issued on said application on April 18, 1933.

Heretofore, the reduction of furan derivatives, and especially furfural, has been practiced only on a laboratory or experimental scale. One laboratory method utilizes the action of hydrogen at a pressure slightly above atmospheric on liquid furfural and other furan derivatives in the presence of a noble metal catalyst, such as platinum. Another laboratory method utilizes furfural in the vapor phase, mixed with hydrogen, and passed over iron or nickel catalysts, maintained at temperatures ranging between 190° and 200° C. The first method gives relatively high yields of reduction products but is extremely expensive because of the high cost of the catalyst. The second method is inefficient because of the low yields of reduction products and the uncontrollable nature of the process which results in the production of a heterogeneous mixture of compounds whose nature or per cent cannot be predetermined.

This invention deals with hydrogenolysis reactions of furan compounds and in particular refers to such specific cases of hydrogenolysis as the production of methyl furan, tetrahydrofuran and 1,2- and 1,5-amylene glycols from furfural or furfuryl alcohol. These are reactions in which there is a cleavage between carbon to carbon or carbon to oxygen bonds followed by addition of hydrogen (cf. Ellis—"Hydrogenation of Organic Substances," 3rd ed. D. Van Nostrand Company, New York, 1930, page 584).

I have discovered that the reduction of furfural and other furan derivatives can be easily and economically effected by hydrogenation under pressure at an elevated temperature in the presence of a base metal catalyst. By my improved process, the products of hydrogenation are obtained in high yields and the reduction can be so controlled that the production of undesirable products can be minimized or substantially eliminated.

In one embodiment of my invention, the chief products of the reduction of furfural or furan compounds are furan derivatives in which the lateral chain or substituting group or groups have been hydrogenated with or without the simultaneous addition of hydrogen to the furan nucleus. For example, furfural may be hydrogenated to furfuryl alcohol (lateral hydrogen addition), or it may be hydrogenated to tetrahydrofurfuryl alcohol (lateral and nuclear addition), or furfuralacetone may be reduced to a furyl butanol. These processes form the subject matter of my aforesaid Patent No. 1,903,850, and another one of my patents, No. 1,906,873, issued on May 2, 1933, which is a continuation in part of the first said patent.

The invention of the present application has for one of its objects the production from furan products of open chain compounds.

Another object of this invention is the production of amylene glycols from furfural.

Another object of this invention is the production of hydrogenolysis products from a compound containing the furan ring.

Another object of this invention is the production of methyl furan and tetrahydrofuran from liquid furfural.

The following examples indicate the general method of producing the reactions mentioned above.

Example 1

An aqueous solution of 747 parts of magnesium nitrate hexahydrate $(Mg(NO_3)_2-6H_2O)$ and 581.6 parts of nickel nitrate hexahydrate $(Ni(NO_3)_2-6H_2O)$ is heated to boiling and to it is added, with constant stirring, a hot aqueous solution of 393 parts of sodium hydroxide. The precipitated hydroxides are filtered, washed free from nitrates and sodium compounds, dried and reduced in a stream of hydrogen for approximately ten hours at a temperature of 320° C.

This catalyst, comprising metallic nickel and magnesium oxide, is then added to furfural to which has been added a solvent comprising, for example, tetrahydrofurfuryl alcohol and small amounts of n-amyl alcohol, the amount of catalyst being from 2% to 5% of the weight of furfural. The mixture is introduced into an autoclave having an agitating device and hydrogen is admitted until a pressure of from 700 lbs. to 1900 lbs. is reached. The temperature is maintained at 100° C.–140° C., and the mixture is stirred vigorously until absorption of hydrogen has ceased.

Under these conditions a final product is obtained which is free from unsaturated compounds and which contains for the most part tetrahydrofurfuryl alcohol with small amounts of amylene glycols.

Example 2

To make the catalyst, 118.7 parts of nickel carbonate are thoroughly mixed with 58.7 parts of kieselguhr. The mixture is then reduced in a stream of hydrogen for approximately three hours at a temperature of approximately 360° C. and cooled in an atmosphere of carbon dioxide, or nitrogen, or other inert gas.

This catalyst is then added to furfural, with or without the addition of a solvent, in the proportions of 25 parts by weight of the catalyst to 576 parts by weight of furfural. The mixture is introduced into an autoclave having an agitating device. Hydrogen is admitted and maintained at a pressure of 1000 lbs. to 1800 lbs. while the temperature is maintained at 90° C.–140° C. for a period of two hours, the mixture being stirred vigorously during the process. Under these conditions a product is obtained which contains a substantial amount of methyl furan.

*Example 3*

A catalyst is prepared as in Example 2, and 25 parts by weight of this is added to 575 parts by weight of furfural, and the mixture is introduced into an autoclave having an agitating device. Hydrogen is admitted and maintained at a pressure of 1800–1900 lbs., while the temperature is raised to 170° C. and the mixture is being vigorously agitated. Heating is discontinued when the temperature reaches 170° C., but the heat of reaction will generally carry the temperature of the entire apparatus up to 200° C. or possibly higher. The mixture is stirred as long as there is hydrogen absorption, and if the temperature begins to drop while hydrogen is still being absorbed, heat is applied to maintain the temperature at or near the maximum attained during the reaction.

Under these conditions a final product is obtained which contains tetrahydrofurfuryl alcohol, methyl furan and amylene glycols. The amylene glycols can be separated from the mixture of reaction products by a simple distillation process.

*Example 4*

Ten parts by weight of an active nickel catalyst prepared in a manner similar to that described by Raney in U. S. Patent No. 1,628,190 (May 19, 1927), is added to 450 parts by weight of furfural in an autoclave fitted with an agitator. Hydrogen is admitted till a pressure of about 1800 lbs. per square inch is reached and the mixture is heated and stirred vigorously. By the time the temperature reaches 150–165° C., the heat of reaction is sufficient to raise the temperature of the autoclave and its contents to 200° C., or possibly higher. During this period of vigorous reaction, the application of heat is discontinued, but when the temperature ceases to rise heating is resumed until a temperature of 210–220° C. is reached. This temperature is maintained until the absorption of hydrogen practically ceases.

Under these conditions the final reaction product contains some methyl furan and other low boiling products, such as tetrahydrofuran, some tetrahydrofurfuryl alcohol, and substantial quantities of amylene glycols. These various compounds may be obtained in a satisfactory degree of purity by fractional distillation.

The relative amount of low boiling compounds obtained in this example is less than that produced in Example 3, because the Raney catalyst contains some basic aluminum oxide. Other basic materials, such as soda ash, sodium hydroxide magnesium oxide, calcium hydrate, etc., have been used with other nickel catalysts with similar results.

The relative quantities of the various reduction products may be varied by changing the type of catalyst, the temperature and/or pressure of the reaction, the rate of heating, etc. The reaction may be carried out in the presence of solvents, such as water, alcohol, ether, etc., but it is obvious that it is impractical to attempt to illustrate all the possible variations of my process since such modifications and variations are well within the purview of those skilled in the art.

In practicing the foregoing processes, I contemplate the use of technical furfural which contains about one and one-half per cent (1½%) of water, or quantities in excess thereof. Consequently, it is to be understood that the term furfural as employed herein is not limited to furfural that is absolutely devoid of water, but pertains to the technical furfural used in the industrial arts. Therefore, I do not wish to be limited in the practice of my invention, except by such limitations as are imposed by the following claims.

I claim:

1. A method for preparing amylene glycols which consists in hydrogenating furfural in the presence of a nickel catalyst under an elevated temperature and superatmospheric pressure, and separating the amylene glycols from the reaction mixture.

2. A method for preparing amylene glycols which consists in hydrogenating furfural in the presence of a nickel catalyst and an alkaline material under elevated temperatures and superatmospheric conditions of pressure, and separating the amylene glycols from the reaction mixture.

3. A method for preparing amylene glycols which comprises hydrogenating furfural in the presence of a nickel catalyst at temperatures between 170° C. and 220° C. and pressures greater than 100 atmospheres.

4. A method for preparing amylene glycols which comprises reacting furfural with hydrogen, in the presence of a nickel catalyst and an alkaline material at a temperature in excess of 170° C. and a pressure greater than 100 atmospheres until the absorption of hydrogen substantially ceases and separating the amylene glycols from other reaction products by fractional distillation.

5. A method for preparing hydrogenolysis products from a compound containing the furan ring comprising treating the liquid furan compound with hydrogen in the presence of a base metal catalyst under superatmospheric pressure and temperature, and separating said hydrogenolysis products from the reaction mixture.

6. A method for the preparation of methyl furan which comprises reacting liquid furfural in the presence of a nickel catalyst and hydrogen under superatmospheric temperature and pressure, and separating the methyl furan from the reaction mixture.

7. A method for the preparation of tetrahydrofuran which comprises reacting liquid furfural in the presence of a nickel catalyst and hydrogen under a superatmospheric pressure and temperatures within the approximate range of 170–220° C.

FREDUS N. PETERS, Jr.